United States Patent
Fighel

(10) Patent No.: US 8,792,882 B2
(45) Date of Patent: Jul. 29, 2014

(54) METHOD AND APPARATUS FOR NON-NATIVE SHORT MESSAGE SERVICE COMMUNICATIONS

(71) Applicant: Vonage Network LLC, Holmdel, NJ (US)

(72) Inventor: Guy Fighel, Red Bank, NJ (US)

(73) Assignee: Vonage Network LLC, Holmdel, NJ (US)

( * ) Notice: Subject to any disclaimer, the term of this patent is extended or adjusted under 35 U.S.C. 154(b) by 0 days.

(21) Appl. No.: 13/829,560

(22) Filed: Mar. 14, 2013

(65) Prior Publication Data

US 2014/0179308 A1   Jun. 26, 2014

Related U.S. Application Data

(60) Provisional application No. 61/779,543, filed on Mar. 13, 2013, provisional application No. 61/745,926, filed on Dec. 26, 2012.

(51) Int. Cl.
*H04W 4/00*   (2009.01)

(52) U.S. Cl.
USPC .............. 455/432.1; 455/432.2; 455/466; 455/445; 370/352

(58) Field of Classification Search
USPC ........ 455/432.1, 432.2, 435.1, 466, 445, 433; 370/352-356, 401, 465-467
See application file for complete search history.

(56) References Cited

U.S. PATENT DOCUMENTS

| | | | |
|---|---|---|---|
| 2007/0167167 A1 | 7/2007 | Jiang | |
| 2008/0045250 A1* | 2/2008 | Hwang | 455/466 |
| 2008/0153480 A1 | 6/2008 | Jiang | |
| 2012/0135722 A1* | 5/2012 | Jiang | 455/415 |
| 2013/0182702 A1* | 7/2013 | Ku | 370/352 |
| 2013/0231083 A1* | 9/2013 | Keren | 455/408 |

OTHER PUBLICATIONS

International Search Report and Written Opinion mailed Mar. 27, 2014 for Application No. PCT/US2013/076979, 9 pages.

* cited by examiner

*Primary Examiner* — Ajit Patel
(74) *Attorney, Agent, or Firm* — Moser Taboada; Joseph Pagnotta

(57) ABSTRACT

Methods and apparatus for routing non-native Short Message Service (SMS) messages to a first device, the first device being assigned a native identifier and being associated with a native telephony service provider, are provided herein. In some embodiments, the method includes receiving an SMS message directed to the native identifier of the first device, determining routing instructions for the SMS message based on the native network identifier associated with the first device, and routing the SMS message to the first device based on the determined routing instructions, wherein the act of routing results in SMS messages directed to the native identifier of the first device being directed to a forwarding identifier assigned to the first device by a first non-native communication service provider.

14 Claims, 5 Drawing Sheets

METHOD AND APPARATUS FOR NON-NATIVE SHORT MESSAGE SERVICE COMMUNICATIONS

CROSS-REFERENCE TO RELATED APPLICATIONS

This application claims benefit of U.S. provisional patent application Ser. No. 61/779,543, filed Mar. 13, 2013, and provisional patent application Ser. No. 61/745,926, filed Dec. 26, 2012, which is herein incorporated by reference.

BACKGROUND OF THE INVENTION

1. Field

The invention is related to systems and methods for terminating communications to a telephony device. More specifically, the invention relates to systems and methods for routing Short Message Service (SMS) communication between mobile devices on different mobile service provider networks.

2. Description of the Related Art

Mobile telephony devices, such as cellular telephones and mobile computing devices with Short Message Service (SMS) communication capabilities, are typically provided with service from a mobile service provider. The mobile service provider typically only provides service to its customers within a defined geographical area, often only within a single country. The area served by the provider is considered the "native" service area for customers who receive mobile telephone service from the provider.

If a customer who receives mobile telephone service from a first "native" mobile service provider travels to an area outside his native service area, the customer's mobile telephone may be capable of receiving mobile service from a second "non-native" service provider that provides coverage in that location. However, because the non-native service provider is not the customer's regular service provider, the customer will be charged special "roaming" fees for receiving incoming communications and for sending outgoing communications from that location. Typically, the non-native mobile service provider charges the user's native mobile service provider for providing service to the customer's cellular telephone, and the native mobile service provider then passes those charges along to the customer as part of his regular monthly bill. This is true for telephone calls, text messages, and other forms of telephony communications.

Roaming charges can be exorbitant compared to fees charged for telephony communications within the customer's native service area. International roaming charges are particularly expensive, as the rates negotiated between carriers for overseas call termination has been at a premium.

Accordingly, the inventors have provided improved systems and methods for sending and receiving Short Message Service (SMS) communication between mobile devices on different mobile service provider networks.

SUMMARY OF THE INVENTION

Methods and apparatus for routing non-native Short Message Service (SMS) messages to a first device, the first device being assigned a native identifier and being associated with a native telephony service provider, are provided herein. In some embodiments, the method includes receiving an SMS message directed to the native identifier of the first device, determining routing instructions for the SMS message based on the native network identifier associated with the first device, and routing the SMS message to the first device based on the determined routing instructions, wherein the act of routing results in SMS messages directed to the native identifier of the first device being directed to a forwarding identifier assigned to the first device by a first non-native communication service provider.

In some embodiments, a method of routing non-native Short Message Service (SMS) messages from a first device, the first device being assigned a native identifier and being associated with a native telephony service provider, may include receiving an SMS message from the first device directed to a second device on a second communication service provider, wherein the SMS message from the first device is sent from a first non-native communication service provider and includes the native identifier assigned to the first device, determining a cost associated with routing the SMS message based on at least one of the native network identifier associated with the first device or an Internet Protocol (IP) address associated with the received SMS message, and routing the SMS message to the second device.

In some embodiments, an apparatus for routing non-native Short Message Service (SMS) messages to a first device, the first device being assigned a native identifier and being associated with a native telephony service provider, may include at least one processor, at least one input device, and at least one storage device storing processor-executable instructions which, when executed by the at least one processor, performs a method including receiving an SMS message directed to the native identifier of the first device determining routing instructions for the SMS message based on the native network identifier associated with the first device, and routing the SMS message to the first device based on the determined routing instructions, wherein the act of routing results in SMS messages directed to the native identifier of the first device being directed to a forwarding identifier assigned to the first device by a first non-native communication service provider.

BRIEF DESCRIPTION OF THE FIGURES

Embodiments of the present invention, briefly summarized above and discussed in greater detail below, can be understood by reference to the illustrative embodiments of the invention depicted in the appended drawings. It is to be noted, however, that the appended drawings illustrate only typical embodiments of this invention and are therefore not to be considered limiting of its scope, for the invention may admit to other equally effective embodiments.

Figure 1:
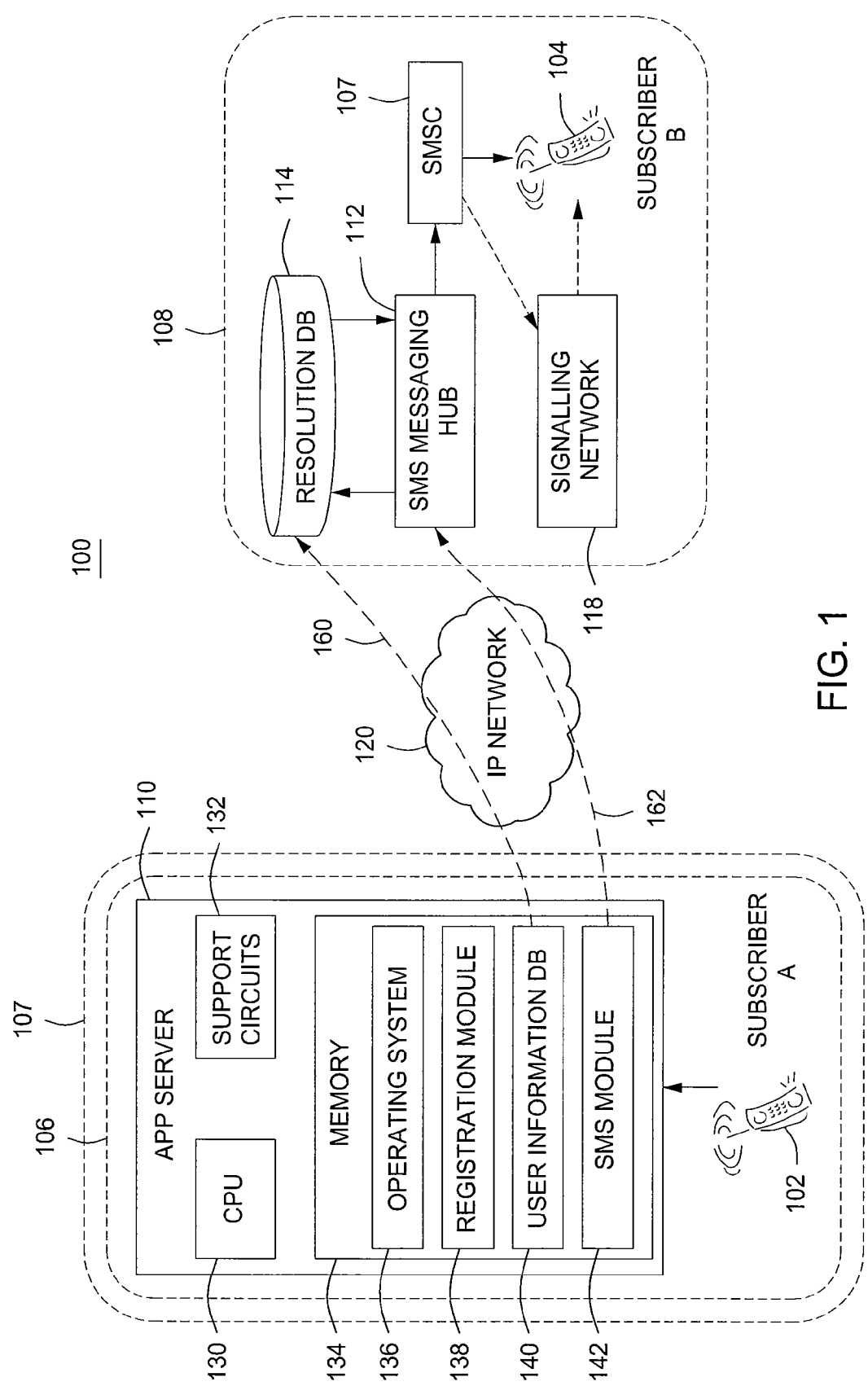
FIG. 1 is a system level representation of elements that interact with each other to terminate SMS communications to mobile telephony devices according to some embodiments of the present invention.

To facilitate understanding, identical reference numerals have been used, where possible, to designate identical elements that are common to the figures. The figures are not drawn to scale and may be simplified for clarity. It is contemplated that elements and features of one embodiment may be beneficially incorporated in other embodiments without further recitation.

DETAILED DESCRIPTION

Exemplary embodiments consistent with the present invention allow SMS communications to be handled by telephony service providers other than the native carrier associated with the subscriber device. Thus a subscriber to such non-native messaging services is able to realize lower communication costs as the messages are passed over the non-native network through the non-native network's SMS server rather than through the native carrier's equipment and network.

In the following description, references are made to a user's or a customer's telephony device. This term encompasses traditional cellular telephones, as well as mobile telephony devices that include additional functionality, such as the ability to wirelessly communicate digital data. These terms also encompass mobile computing devices that include SMS communication capabilities provided by either or both of a cellular transceiver and a wireless digital data transceiver. Examples of such devices include the Apple iPhone™, the Apple iPod Touch™, mobile telephony devices running the Android™ or a Windows® operating system, the Blackberry™ and mobile telephones running the Symbian® operating system, and the like.

The following description also refers to terminating a telephony communication. This phrase refers to delivering text messages and other forms of text-based or video-based messaging to a telephony device. This phrase also encompasses other forms of communications that may be carried over a telephony network.

Some embodiments of the present invention provide a method, system and apparatus for terminating a telephony communication to a telephony device via an Internet Protocol (IP) such as Voice over IP (VoIP) telephony system. In some instances, the telephony communication is terminated to the telephony device through the VoIP telephony system because the telephony device is roaming, and roaming charges would apply if the telephony communication was terminated in a traditional fashion. Terminating the telephony communication through the VoIP telephony system makes it possible to avoid the roaming charges. In other instances, the telephony communication is terminated through the VoIP telephony system for some other reason, as will be explained below.

In some instances, however, such as where no other options exist, the IP telephony system might deliberately cause the telephony communication to be terminated to a roaming telephony device in a traditional fashion through native mobile telephony service provider. While this might result in the user incurring roaming charges, terminating the telephony communication in this fashion may be the only way to reach the user.

The following description provides examples of how embodiments of the present invention can be used to terminate SMS communications to a mobile telephone device via a VoIP telephony system. The mobile telephony device could be a cellular telephony or a smart phone. However, embodiments of the present invention are also applicable to other types of devices that are operable as telephones such as laptop or personal computing devices running application software that provides for telephony communications. Thus, the reference to a mobile telephony device should not be considered in any way limiting. In some embodiment systems and methods described herein can also be used to terminate SMS communications to telephony devices other than traditional mobile telephony devices.

FIG. 1 depicts various elements that may be involved in terminating an SMS communications. The system 100 comprises a first telephony network 106 communicatively coupled to a second telephony network 108 via an IP network 120. In FIG. 1, a subscriber A associated with a telephony device 102 on the first network 106 is sending an SMS communication to a subscriber B associated with a telephony device 104 on the second telephony network 108. In some embodiments, the first network 106 may be a non-native network such as a VoIP provider network running on an IP network. In some embodiments as described herein, a non-native telephony network 106 may refer to a telephony network that is not the typical service provider for a telephony device on that network. For example, with respect to FIG. 1, subscriber A's service provider for telephony device 102 may be different than the service provider associated with the first telephony network 106. For example, subscriber A may access the first (non-native) telephony network 106 via a mobile application installed on device 102. In some embodiments, subscriber A may first access a native telephony network (or other type of wireless or wired network) 107 in order to gain access to the first (non-native) telephony network 106 via the mobile application installed on device 102. In other embodiments, the first telephony network 106 refers to a telephony network that is the same service provider for the telephony device 102 on that network.

The subscriber A associated with telephony device 102 may opt in to the non-native service provider's SMS offering (e.g., an AT&T® subscriber may opt into an SMS offering from Vonage® VoIP services). The subscriber may opt in by installing a mobile application provided by the non-native service provider to facilitate the sending and receiving of SMS messages. When a subscriber opts-in to the non-native service providers SMS offering, the subscriber's native network identifier (e.g., the subscriber's telephone number) becomes associated with the non-native service providers application server 110. The non-native service provider may assign a forwarding identifier to the first device upon registration. Thus, when subscriber A sends/recieves an SMS communication, the SMS message is routed to, and handled by, non-native application server 110 rather than the traditional (i.e., native) mobile service provider's equipment that subscriber A has telephony service with.

The application server 110 comprises a Central Processing Unit (CPU) 130, support circuits 132 and a memory 134. The CPU 130 may comprise one or more commercially available microprocessors or microcontrollers that facilitate data processing and storage. The various support circuits 132 facilitate the operation of the CPU 130 and include one or more clock circuits, power supplies, cache, input/output circuits, and the like. The memory 134 comprises at least one of Read Only Memory (ROM), Random Access Memory (RAM), disk drive storage, optical storage, removable storage and/or the like. In some embodiments, the memory 134 comprises (or may otherwise be associated or communicatively couple with) an operating system 136, a registration module 138, a user information database 140, and an SMS module 142. In some embodiments, the database of user information is stored remotely on a remote server (not shown) and the user profiles are retrieved from the remote server by an subscriber identifier when needed.

The operating system (OS) 136 generally manages various computer resources (e.g., network resources, file processors, and/or the like). The operating system 136 is configured to execute operations on one or more hardware and/or software modules, such as Network Interface Cards (NICs), hard disks, virtualization layers, firewalls and/or the like. Examples of the operating system 136 may include, but are not limited to, Linux, Mac OSX, BSD, Unix, Microsoft Windows, and the like.

In some embodiments, in order to access the SMS offering from the non-native service provider, the subscriber first registers with the non-native service provider via registration module 138 on application server 110. The subscriber's mobile device identification number (e.g., the subscriber's telephone number) is associated with a subscriber ID and stored in user information DB 140. Thus, the subscriber's mobile device identification number becomes associated with the non-native service providers application server 110.

The non-native service provider may partner with a second mobile telephony provider of the second telephony network 108 to provide SMS messages to each other customers. In such a partnership, the non-native service provider may provide a list of users and their associated information from user information DB 140 to the second mobile telephony provider. The second mobile telephony provider may store the user information in a resolver database 114. The resolver database 114 may be updated in realtime, in batch mode, or at scheduled intervals via connection 160 over IP network 120.

SMS communications from subscribers that opted in to the non-native service provider's SMS offering would be routed by application server 110 to the intended recipient. The SMS message would be sent over IP network 120 via Short Message Peer-to-Peer (SMPP) protocol to SMS messaging hub 112 on the second telephony network 108. The SMS messaging hub 112 would convert the SMPP protocol received from the application server 110 to a native signalling network 118 for delivery subscriber B. In some embodiments, the native signalling network 118 may be GSM or CDMA. In other embodiments, the second network may be a VoIP network and thus the SMS message may not need to be coverted.

In some embodiments, upon receipt of an SMS message from application server 110, the SMS hub 112 may perform a look-up in the resolver DB 114 using telephone number mapping (e.g., E.164 Number Mapping (ENUM) mapping, and the like) to determine whether the subscriber who sent the SMS message is a subscriber of the partner non-native server provider. The lookup may be done to determine costs for terminating the SMS message that are charged back to the non-native service provider, and ultimately back to the subscriber. In some embodiments, the SMS hub 112 may not perform a look-up in the resolver DB 114, but rather identify the incoming message as being associated with the partner non-native server provider based on the IP address of the incoming message. The SMS message is then routed from the SMS hub 112 to message service center (SMSC) 116 and terminated at device 104. In some embodiments, if the subscriber's mobile number (e.g., subscriber A who originated the SMS message) is not stored in resolver DB 114, then signaling network 118 will be used to send the SMS message.

Figure 2:
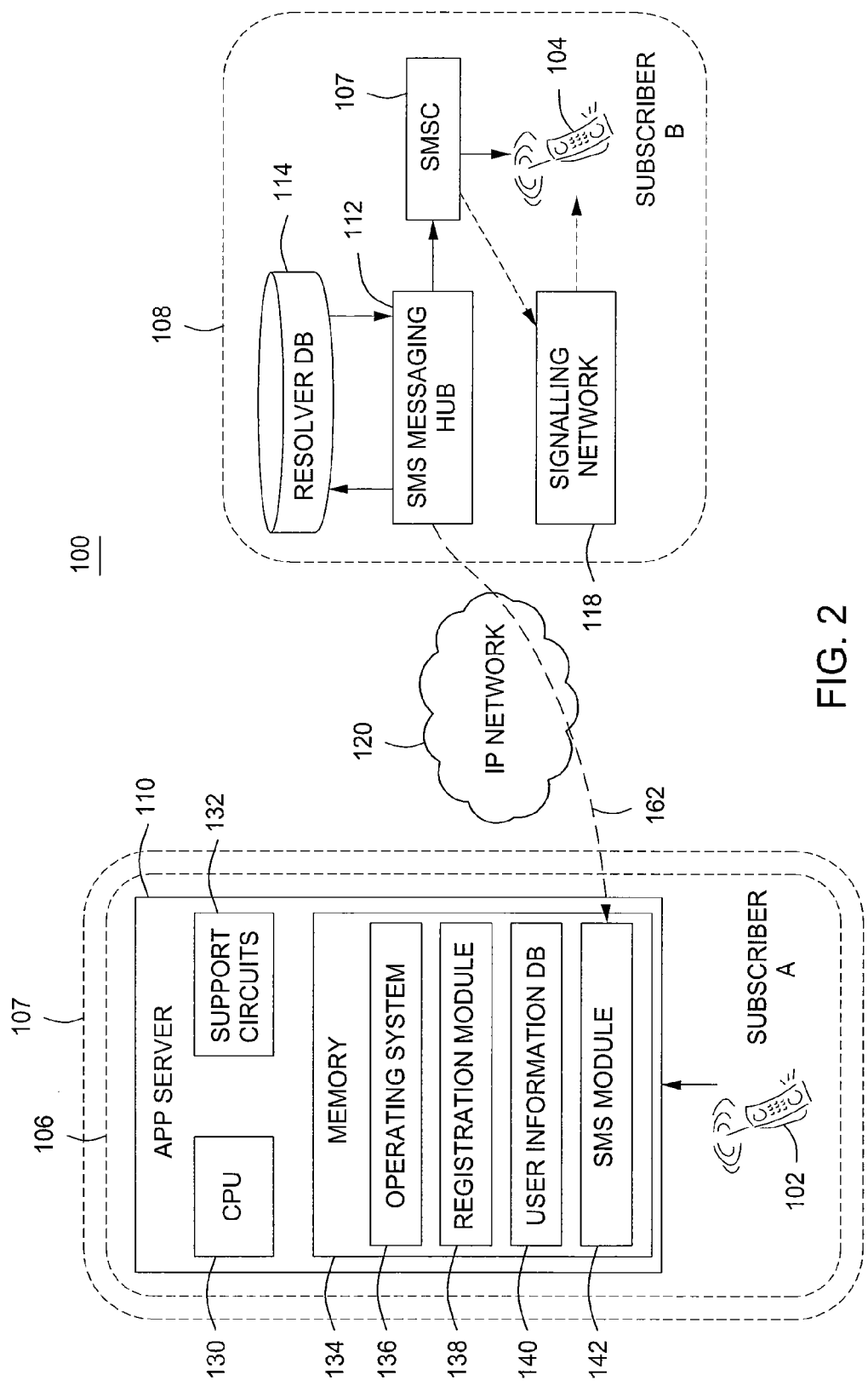
FIG. 2 is a second system level representation of elements that interact with each other to terminate SMS communications to mobile telephony devices according to some embodiments of the present invention.

Similarly, FIG. 2 depicts various elements that may be involved in terminating an SMS communications originating from subscriber B on the second telephony network 108 in reply to a message, for example from subscriber A associated with a telephony device 102 on the first telephony network 106.

When subscriber B sends an SMS message to subscriber A, SMS hub 112 will determine how to route the message. As described above with respect to FIG. 1, the SMS hub 112 will perform a look-up using telephone number mapping (e.g., E.164 Number Mapping (ENUM) mapping, and the like) to determine whether the SMS communication should be routed to non-native application server 110 or to a traditional mobile operator associated with the subscriber. If the SMS message is to be routed using the first telephony network 106, the SMS message to subscribers that opted in to the non-native service provider's SMS offering will be routed to non-native application server 110 using Short Message Peer-to-Peer (SMPP) protocol. In some embodiments, the SMS message may be routed using HyperText Transfer Protocol REpresentational State Transfer Service (HTTP REST) or any other IP based protocol including proprietary protocols.

In some embodiments, for example, any SMS message from a subscriber of the first telephony network to a foreign country such as India will be routed exclusively to messaging hub 112 (via, e.g., an IP VPN connection). In those embodiments, the SMS "From" field may contain the original mobile number for the subscriber on their native network. That is, if subscriber A has their normal telephony service through AT&T®, then subscriber A's AT&T mobile number may be displayed in the "From" field. When the recipient subscriber (subscriber B) responds to said SMS message from subscriber A, SMSC 116 will check real time resolution database 114 to see if subscriber A's mobile number is registered. If subscriber A's mobile number is registered in resolution database 514, the SMS message will be routed over IP VPN to the first telephony 106. Any message originating from the second telephony network 108 to any international number will first be looked up in the user information db 140 on the first telephony network 106. If there is a match, the message will be delivered to the mobile telephony application on mobile device 102 using network 106.

Figure 3:
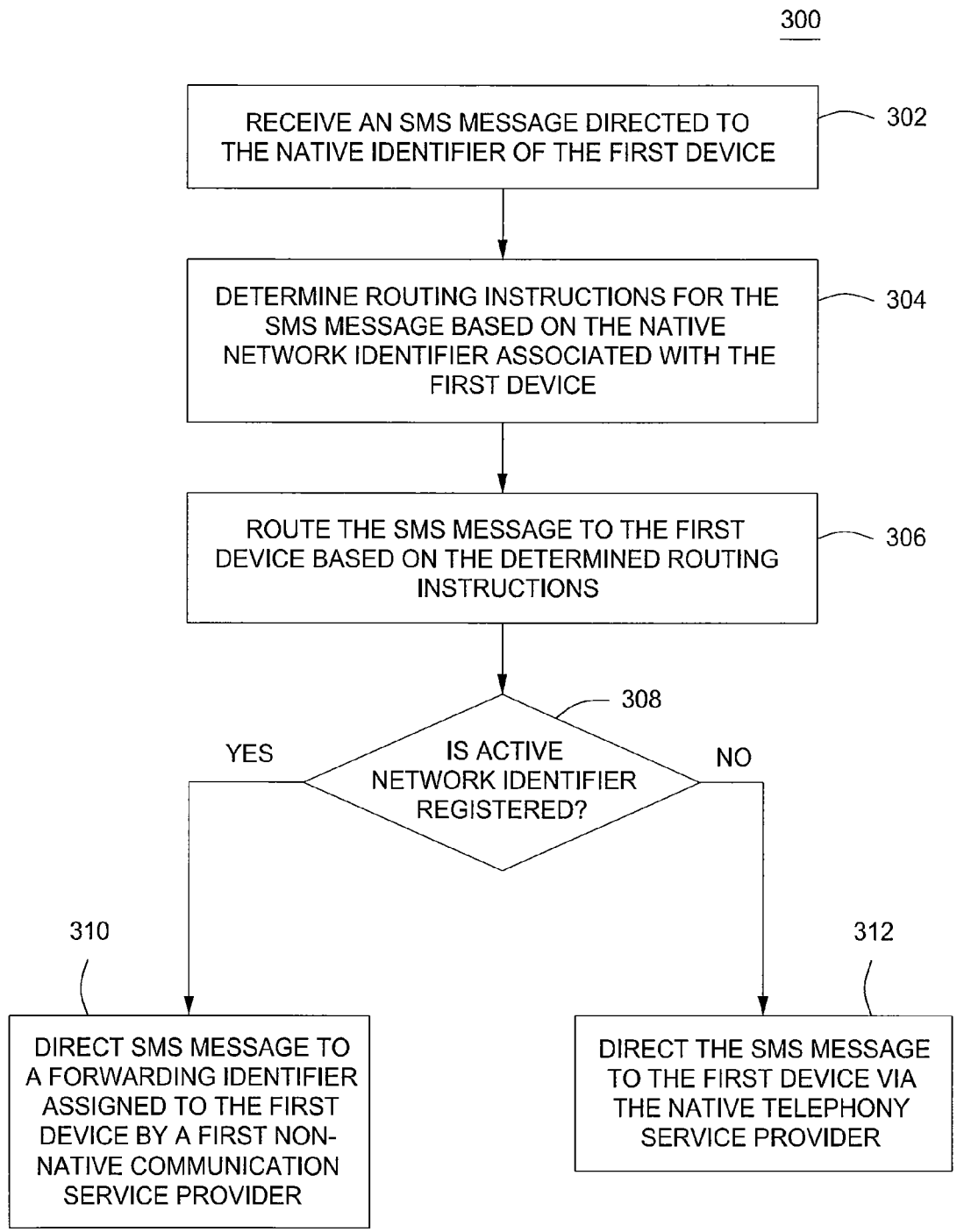
FIG. 3 is a flow chart of a method for routing Short Message Service (SMS) messages to a first device, the first device being assigned a native identifier and being associated with a native telephony service provider, according to some embodiments of the present invention.

FIG. 3 depicts an exemplary method consistent with the elements and features described with respect to FIG. 2. Specifically, at 302 an SMS message may be received by SMS messaging hub 112 by a second subscriber (e.g., subscriber B in FIG. 2) on a second telephony network (e.g., network 108 in FIG. 2) to a first subscriber (e.g., subscriber A in FIG. 2). The SMS message may be directed to a native identifier associated with the first device. At 304, routing instructions may be determined for the SMS message based on the native network identifier associated with the first device. In some embodiments, the routing instructions may be determined by SMS messaging hub 112 by extracting the native network identifier associated with the first device from the "FROM:" field in the SMS message. At 306, the SMS message may be routed to the first device based on the determined routing instructions. In some embodiments, the act of determining routing instructions may include performing a search in resolution partner database 114 to determine if the native network identifier is associated with a subscriber of the first non-native communication server provider. At 308, if it is determined that the native network identifier is associated with a subscriber of the first non-native communication server provider (i.e., the subscriber is registered with the first non-native communication server provider), then the method proceeds to 310. At 310, the SMS message is directed to a forwarding identifier assigned to the first device by the first non-native communication service provider. In some embodiments, the act of directing the SMS message to a forwarding identifier assigned to the first device includes terminating the SMS communication to the first device using a data channel provided by the first non-native communication service provider. If it is determined that the native network identifier is not associated with a subscriber of the first non-native communication server provider (i.e., the subscriber is not registered with the first non-native communication server provider) at 308, then the method proceeds to 312. At 312, the SMS message is directed to the first device via the native telephony service provider associated with the first device.

Figure 4:
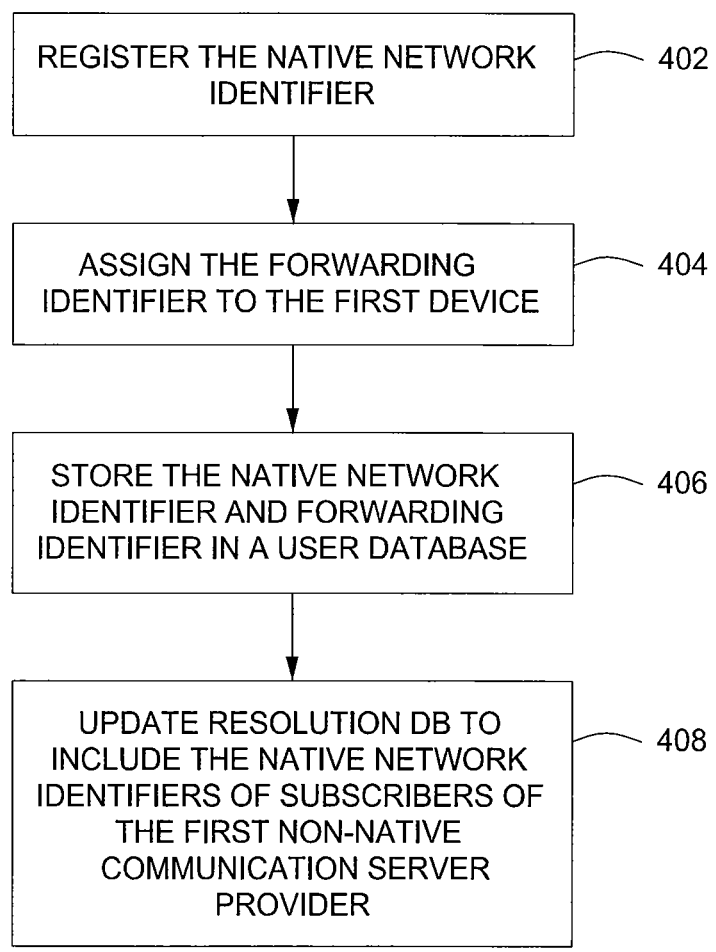
FIG. 4 is a flow chart of a method for registering a first device, the first device being assigned a native identifier and being associated with a native telephony service provider, with a non-native server provider according to some embodiments of the present invention.

FIG. 4 is a flow chart of a method for registering a first device, the first device being assigned a native identifier and being associated with a native telephony service provider, with a non-native server provider according to some embodiments of the present invention. Specifically, at 402 a subscriber may register (e.g., opt in) the first device, and the native identifier assigned to the first device, with a first non-native service provider's SMS offering. At 404, a forwarding identifier may be assigned to the first device by first non-native service provide. At 406, the registered native network identifier, assigned forwarding identifier, and other information associated with a subscriber associated with the first device may be stored in a user database (e.g., user information DB 140) maintained by the first non-native communication service provider. At 408, the information stored in the user database may be used to update a resolution database 114 which is used in methods and systems described above. In some embodiments, the resolution database 114 may be updated to include the native network identifiers of subscribers of the first non-native communication server provider using information stored in a user database maintained by the first non-native communication service provider.

The embodiments of the present invention may be embodied as methods, apparatus, electronic devices, and/or computer program products. Accordingly, the embodiments of the present invention may be embodied in hardware and/or in software (including firmware, resident software, micro-code, and the like), which may be generally referred to herein as a "circuit" or "module". Furthermore, the present invention may take the form of a computer program product on a computer-usable or computer-readable storage medium having computer-usable or computer-readable program code embodied in the medium for use by or in connection with an instruction execution system. In the context of this document, a computer-usable or computer-readable medium may be any medium that can contain, store, communicate, propagate, or transport the program for use by or in connection with the instruction execution system, apparatus, or device. These computer program instructions may also be stored in a computer-usable or computer-readable memory that may direct a computer or other programmable data processing apparatus to function in a particular manner, such that the instructions stored in the computer usable or computer-readable memory produce an article of manufacture including instructions that implement the function specified in the flowchart and/or block diagram block or blocks.

Computer program code for carrying out operations of the present invention may be written in an object oriented programming language, such as Java®, Smalltalk or C++, and the like. However, the computer program code for carrying out operations of the present invention may also be written in conventional procedural programming languages, such as the "C" programming language and/or any other lower level assembler languages. It will be further appreciated that the functionality of any or all of the program modules may also be implemented using discrete hardware components, one or more Application Specific Integrated Circuits (ASICs), or programmed Digital Signal Processors or microcontrollers.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the present disclosure and its practical applications, to thereby enable others skilled in the art to best utilize the invention and various embodiments with various modifications as may be suited to the particular use contemplated.

Figure 5:
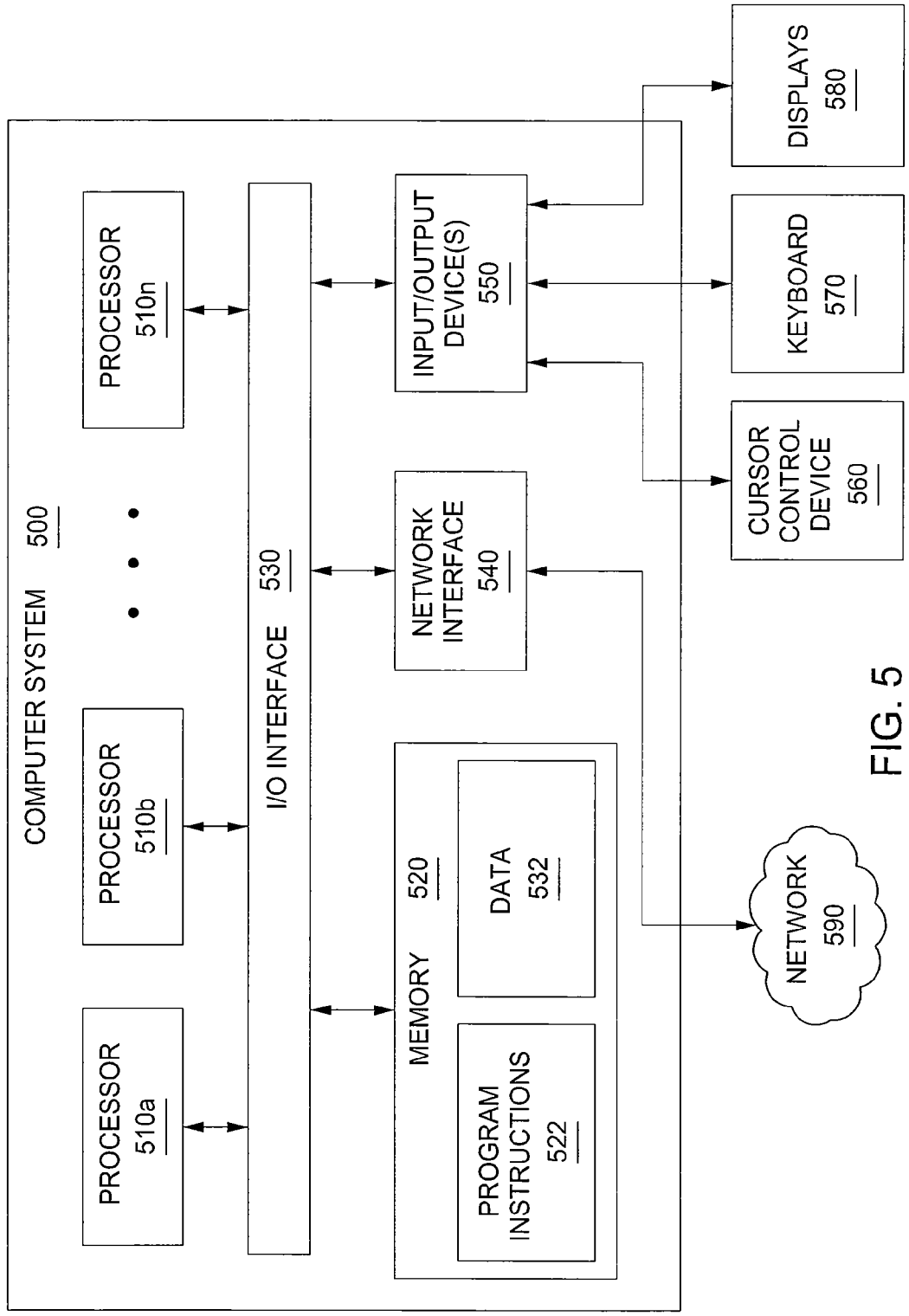
FIG. 5 depicts a computer system that can be utilized in various embodiments of the present invention, according to one or more embodiments.

FIG. 5 depicts a computer system 500 that can be utilized in various embodiments of the present invention to implement the computer and/or the display, according to one or more embodiments.

Various embodiments of method and apparatus for transitioning between a plurality of pages on a display device, as described herein, may be executed on one or more computer systems, which may interact with various other devices. One such computer system is computer system 500 illustrated by FIG. 5, which may in various embodiments implement any of the elements or functionality illustrated in FIGS. 1-4. In various embodiments, computer system 500 may be configured to implement methods described above. The computer system 500 may be used to implement any other system, device, element, functionality or method of the above-described embodiments. In the illustrated embodiments, computer system 500 may be configured to implement methods 300 and 400 as processor-executable executable program instructions 522 (e.g., program instructions executable by processor(s) 510) in various embodiments.

In the illustrated embodiment, computer system 500 includes one or more processors 510$a$-510$n$ coupled to a system memory 520 via an input/output (I/O) interface 530. Computer system 500 further includes a network interface 540 coupled to I/O interface 530, and one or more input/output devices 550, such as cursor control device 560, keyboard 570, and display(s) 580. In various embodiments, any of the components may be utilized by the system to receive user input described above. In various embodiments, a user interface may be generated and displayed on display 580. In some cases, it is contemplated that embodiments may be implemented using a single instance of computer system 500, while in other embodiments multiple such systems, or multiple nodes making up computer system 500, may be configured to host different portions or instances of various embodiments. For example, in one embodiment some elements may be implemented via one or more nodes of computer system 500 that are distinct from those nodes implementing other elements. In another example, multiple nodes may implement computer system 500 in a distributed manner.

In different embodiments, computer system 500 may be any of various types of devices, including, but not limited to, personal computer systems, mainframe computer systems, handheld computers, workstations, network computers, application servers, storage devices, a peripheral devices such as a switch, modem, router, or in general any type of computing or electronic device.

In various embodiments, computer system 500 may be a uniprocessor system including one processor 510, or a multiprocessor system including several processors 510 (e.g., two, four, eight, or another suitable number). Processors 510 may be any suitable processor capable of executing instructions. For example, in various embodiments processors 510 may be general-purpose or embedded processors implementing any of a variety of instruction set architectures (ISAs). In multiprocessor systems, each of processors 510 may commonly, but not necessarily, implement the same ISA.

System memory 520 may be configured to store program instructions 522 and/or data 532 accessible by processor 510. In various embodiments, system memory 520 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing any of the elements of the embodiments described above may be stored within system memory 520. In other embodiments, program instructions and/or data may be received, sent or stored upon different types of computer-accessible media or on similar media separate from system memory 520 or computer system 500.

In one embodiment, I/O interface 530 may be configured to coordinate I/O traffic between processor 510, system memory 520, and any peripheral devices in the device, including network interface 540 or other peripheral interfaces, such as input/output devices 550. In some embodiments, I/O interface 530 may perform any necessary protocol, timing or other data transformations to convert data signals from one component (e.g., system memory 520) into a format suitable for use by another component (e.g., processor 510). In some embodiments, I/O interface 530 may include support for devices attached through various types of peripheral buses, such as a variant of the Peripheral Component Interconnect (PCI) bus standard or the Universal Serial Bus (USB) standard, for example. In some embodiments, the function of I/O interface 530 may be split into two or more separate components, such as a north bridge and a south bridge, for example. Also, in some embodiments some or all of the functionality of I/O interface 530, such as an interface to system memory 520, may be incorporated directly into processor 510.

Network interface 540 may be configured to allow data to be exchanged between computer system 500 and other devices attached to a network (e.g., network 590), such as one or more external systems or between nodes of computer system 500. In various embodiments, network 590 may include one or more networks including but not limited to Local Area Networks (LANs) (e.g., an Ethernet or corporate network), Wide Area Networks (WANs) (e.g., the Internet), wireless data networks, some other electronic data network, or some combination thereof. In various embodiments, network interface 540 may support communication via wired or wireless general data networks, such as any suitable type of Ethernet network, for example; via telecommunications/telephony networks such as analog voice networks or digital fiber communications networks; via storage area networks such as Fibre Channel SANs, or via any other suitable type of network and/or protocol.

Input/output devices 550 may, in some embodiments, include one or more display terminals, keyboards, keypads, touchpads, scanning devices, voice or optical recognition devices, or any other devices suitable for entering or accessing data by one or more computer systems 500. Multiple input/output devices 550 may be present in computer system 500 or may be distributed on various nodes of computer system 500. In some embodiments, similar input/output devices may be separate from computer system 500 and may interact with one or more nodes of computer system 500 through a wired or wireless connection, such as over network interface 540.

In some embodiments, the illustrated computer system may implement any of the methods described above, such as the methods illustrated by the flowcharts of FIG. 3-4. In other embodiments, different elements and data may be included.

Those skilled in the art will appreciate that computer system 500 is merely illustrative and is not intended to limit the scope of embodiments. In particular, the computer system and devices may include any combination of hardware or software that can perform the indicated functions of various embodiments, including computers, network devices, Internet appliances, PDAs, wireless phones, pagers, and the like. Computer system 500 may also be connected to other devices that are not illustrated, or instead may operate as a stand-alone system. In addition, the functionality provided by the illustrated components may in some embodiments be combined in fewer components or distributed in additional components. Similarly, in some embodiments, the functionality of some of the illustrated components may not be provided and/or other additional functionality may be available.

Those skilled in the art will also appreciate that, while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system via intercomputer communication. Some or all of the system components or data structures may also be stored (e.g., as instructions or structured data) on a computer-accessible medium or a portable article to be read by an appropriate drive, various examples of which are described above. In some embodiments, instructions stored on a computer-accessible medium separate from computer system 500 may be transmitted to computer system 500 via transmission media or signals such as electrical, electromagnetic, or digital signals, conveyed via a communication medium such as a network and/or a wireless link. Various embodiments may further include receiving, sending or storing instructions and/or data implemented in accordance with the foregoing description upon a computer-accessible medium or via a communication medium. In general, a computer-accessible medium may include a storage medium or memory medium such as magnetic or optical media, e.g., disk or DVD/CD-ROM, volatile or non-volatile media such as RAM (e.g., SDRAM, DDR, RDRAM, SRAM, and the like), ROM, and the like.

The methods described herein may be implemented in software, hardware, or a combination thereof, in different embodiments. In addition, the order of methods may be changed, and various elements may be added, reordered, combined, omitted or otherwise modified. All examples described herein are presented in a non-limiting manner. Various modifications and changes may be made as would be obvious to a person skilled in the art having benefit of this disclosure. Realizations in accordance with embodiments have been described in the context of particular embodiments. These embodiments are meant to be illustrative and not limiting. Many variations, modifications, additions, and improvements are possible. Accordingly, plural instances may be provided for components described herein as a single instance. Boundaries between various components, operations and data stores are somewhat arbitrary, and particular operations are illustrated in the context of specific illustrative configurations. Other allocations of functionality are envisioned and may fall within the scope of claims that follow. Finally, structures and functionality presented as discrete components in the example configurations may be implemented as a combined structure or component. These and other variations, modifications, additions, and improvements may fall within the scope of embodiments as defined in the claims that follow.

While the foregoing is directed to embodiments of the present invention, other and further embodiments of the invention may be devised without departing from the basic scope thereof, and the scope thereof is determined by the claims that follow.

The invention claimed is:

1. A method of routing non-native Short Message Service (SMS) messages to a first device, the first device being assigned a native network identifier and being associated with a native telephony service provider, the method comprising:
   (a) receiving an SMS message directed to the native network identifier of the first device;
   (b) determining routing instructions for the SMS message based on the native network identifier associated with the first device, wherein determining routing instructions includes causing a search to be performed to determine if the native network identifier is associated with a subscriber of a first non-native communication service provider; and
   (c) routing the SMS message to the first device based on the determined routing instructions, wherein the act of routing results in SMS messages directed to the native identifier of the first device being directed to a forwarding identifier assigned to the first device by the first non-native communication service provider.

2. A method of routing non-native Short Message Service (SMS) messages to a first device, the first device being assigned a native network identifier and being associated with a native telephony service provider, the method comprising:
   associating the native network identifier of the first device with the forwarding identifier provided by a first non-native communication service provider;
   receiving an SMS message directed to the native network identifier of the first device;
   determining routing instructions for the SMS message based on the native network identifier associated with the first device; and
   routing the SMS message to the first device based on the determined routing instructions, wherein the act of routing results in SMS messages directed to the native identifier of the first device being directed to a forwarding identifier assigned to the first device by the first non-native communication service provider.

3. The method of claim 2, wherein the act of associating includes:
   assigning the forwarding identifier to the first device; and
   storing the native network identifier, forwarding identifier and other information associated with a subscriber associated with the first device in a database.

4. The method of claim 1, wherein the search is performed in a database that is updated to include the native network identifiers of subscribers of the first non-native communication service provider using information stored in a user database maintained by the first non-native communication service provider.

5. The method of claim 1, wherein the search of the database is performed using E.164 Number Mapping (ENUM) mapping.

6. The method of claim 1, wherein the method further comprises directing the SMS message to the first device via the native telephony service provider if it is determined that the native network identifier is not associated with a subscriber of the first non-native communication service provider.

7. The method of claim 1, wherein the first non-native communication service provider is a Voice over Internet Protocol (VoIP) service provider.

8. The method of claim 7, wherein the act of routing comprises causing the SMS message to be terminated to the first device using a data channel provided by the VoIP service provider.

9. An apparatus for routing non-native Short Message Service (SMS) messages to a first device, the first device being assigned a native network identifier and being associated with a native telephony service provider, comprising:
   a) at least one processor;
   b) at least one input device; and
   c) at least one storage device storing processor-executable instructions which, when executed by the at least one processor, performs a method including
      1) receiving an SMS message directed to the native network identifier of the first device,
      2) determining routing instructions for the SMS message based on the native network identifier associated with the first device, wherein determining routing instructions includes causing a search to be performed to determine if the native network identifier is associated with a subscriber of a first non-native communication service provider, and
      3) routing the SMS message to the first device based on the determined routing instructions, wherein the act of routing results in SMS messages directed to the native identifier of the first device being directed to a forwarding identifier assigned to the first device by the first non-native communication service provider.

10. An apparatus for routing non-native Short Message Service (SMS) messages to a first device, the first device being assigned a native network identifier and being associated with a native telephony service provider, comprising:
    a) at least one processor;
    b) at least one input device; and
    c) at least one storage device storing processor-executable instructions which, when executed by the at least one processor, performs a method including
       associating the native network identifier of the first device with the forwarding identifier provided by a first non-native communication service provider;
       receiving an SMS message directed to the native network identifier of the first device;
       determining routing instructions for the SMS message based on the native network identifier associated with the first device; and
    routing the SMS message to the first device based on the determined routing instructions, wherein the act of routing results in SMS messages directed to the native identifier of the first device being directed to a forwarding identifier assigned to the first device by the first non-native communication service provider.

11. The apparatus of claim 10, wherein the act of associating includes:
    assigning the forwarding identifier to the first device; and
    storing the native network identifier, forwarding identifier and other information associated with a subscriber associated with the first device in a database.

12. The apparatus of claim 9, wherein the search is performed in a database that is updated to include the native network identifiers of subscribers of the first non-native communication service provider using information stored in a user database maintained by the first non-native communication service provider.

13. The apparatus of claim 9, wherein the search of the database is performed using E.164 Number Mapping (ENUM) mapping.

14. The apparatus of claim 9, wherein the method further comprises routing the SMS message to the first device via the native telephony service provider if it is determined that the native network identifier is not associated with a subscriber of the first non-native communication service provider.

* * * * *